(12) United States Patent
Marsh

(10) Patent No.: US 6,821,388 B2
(45) Date of Patent: Nov. 23, 2004

(54) METHOD FOR MAKING TISSUE AND TOWEL PRODUCTS CONTAINING CROSSLINKED CELLULOSIC FIBERS

(75) Inventor: David G. Marsh, Covington, WA (US)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 10/424,338

(22) Filed: Apr. 25, 2003

(65) Prior Publication Data

US 2003/0201083 A1 Oct. 30, 2003

Related U.S. Application Data

(60) Provisional application No. 60/375,964, filed on Apr. 25, 2002.

(51) Int. Cl.[7] .......................... D21H 13/02; D21H 27/30
(52) U.S. Cl. ....................... 162/146; 162/111; 162/123; 162/157.6; 8/116.1
(58) Field of Search .......................... 162/9, 157.6, 111, 162/165, 158, 164.1, 141, 168.2, 146, 168.3, 123–129, 11; 8/116.1, 181, 116.4, 184, 195, 115.51, 115.6; 604/375, 378; 536/56

(56) References Cited

U.S. PATENT DOCUMENTS

| | | | |
|---|---|---|---|
| 3,455,778 A | | 7/1969 | Bernardin |
| 4,139,410 A | * | 2/1979 | Tapio et al. ................. 162/206 |
| 4,822,453 A | * | 4/1989 | Dean et al. ............... 162/157.6 |
| 4,889,595 A | * | 12/1989 | Herron et al. ............ 162/157.6 |
| 5,225,407 A | * | 7/1993 | Oakley et al. ............... 514/215 |
| 5,230,776 A | * | 7/1993 | Andersson et al. .......... 162/290 |
| 5,306,395 A | * | 4/1994 | Myren ......................... 162/301 |
| 5,399,240 A | * | 3/1995 | Graef et al. .................... 162/9 |
| 5,635,028 A | | 6/1997 | Vinson et al. |
| 5,667,637 A | * | 9/1997 | Jewell et al. ................ 162/146 |
| 5,755,828 A | * | 5/1998 | Westland ........................ 8/185 |
| 5,865,822 A | * | 2/1999 | Hamajima et al. ........... 604/367 |
| 6,004,429 A | * | 12/1999 | Schiel .......................... 162/111 |
| 6,068,619 A | * | 5/2000 | Hamajima et al. ........... 604/378 |
| 6,328,850 B1 | * | 12/2001 | Phan et al. ................... 162/123 |
| 6,340,411 B1 | * | 1/2002 | Hansen et al. |
| 2002/0007169 A1 | * | 1/2002 | Graef et al. ................. 604/378 |
| 2003/0121623 A1 | * | 7/2003 | Westland et al. ............... 162/9 |

FOREIGN PATENT DOCUMENTS

| | | |
|---|---|---|
| EP | 0 835 957 A2 | 4/1998 |
| GB | 1 510 667 | 5/1978 |
| WO | WO 00/58094 A1 | 10/2000 |

OTHER PUBLICATIONS

Casey, J.P., "Pulp and Paper," *Chemistry and Chemical Technology*, 3d ed., vol. II, John Wiley & Sons, New York, 1980, pp. 940–944.

* cited by examiner

*Primary Examiner*—José A Fortuna
(74) *Attorney, Agent, or Firm*—Christensen O'Connor Johnson Kindness PLLC

(57) ABSTRACT

Tissue and towel products that include crosslinked cellulosic fibers. Methods for making tissue and towel products that include crosslinked cellulosic fibers.

20 Claims, 4 Drawing Sheets

Fig. 6.

| No. | Target BW gsm | Furnish NBSK/NBHK/XL | Structure | Wet Strength Agent kg/MT | CMC kg/MT | Bulk cm³/g | MD tens gf/2-1in | CD tens gf/2-1in | Abs. Capacity g/g | Abs. Time sec | NBSK Refining Level S.R.° |
|---|---|---|---|---|---|---|---|---|---|---|---|
| 1 | 23.0 | 75/25/0 | Strata | 8 | 0.5 | 4.99 | 2710 | 1580 | | | 22 |
| 2 | 23.0 | 75/25/0 | Strata | 8 | 0 | 5.37 | 1463 | 1413 | 6.11 | 5.91 | 20 |
| 3 | 23.0 | 75/25/0 | Strata | 8 | 0 | 5.92 | 1385 | 1410 | 6.30 | 6.46 | 20 |
| 4 | 23.0 | 75/17/8 | Strata | 8 | 0 | 5.90 | 1493 | 1407 | 5.95 | 5.70 | 19 |
| 5 | 23.0 | 75/11.5/13.5 | Strata | 8 | 0 | 6.37 | 1270 | 1240 | 6.46 | 4.35 | 19 |
| 6 | 23.0 | 75/7.8/17.2 | Strata | 8 | 0 | 6.61 | 1287 | 1123 | 6.56 | 3.77 | 19 |
| 7 | 23.0 | 75/7.8/17.2 | Strata | 8 | 0 | 7.36 | 920 | 960 | 7.40 | 3.87 | 19 |
| 8 | 23.0 | 75/7.8/17.2 | Strata | 8 | 0.57 | 6.15 | 1395 | 1235 | 7.08 | 3.78 | 19 |
| 9 | 23.0 | 70/9.4/20.6 | Strata | 8 | 0 | 6.66 | 1035 | 985 | 7.05 | 4.12 | 19 |
| 10 | 23.0 | 70/15/15 | Homog | 6 | 0 | 6.91 | 1266 | 1048 | 6.88 | 4.10 | 16 |
| 11 | 19.0 | 70/15/15 | Homog | 6 | 0.5 | 7.11 | 1056 | 808 | 7.80 | 3.72 | 16 |
| 12 | 23.0 | 70/15/15 | Homog | 6 | 0.5 | 6.76 | 1275 | 1025 | 7.43 | 3.87 | 16 |
| 13 | 23.0 | 70/15/15 | Homog | 6 | 0 | 8.24 | 575 | 430 | 7.99 | 3.66 | 14 |
| 14 | 23.0 | 70/15/15 | Homog | 6 | 0.5 | 8.29 | 780 | 578 | 8.04 | 3.56 | 14 |
| 15 | 23.0 | 70/15/15 | Homog | 6 | 1.0 | 7.64 | 828 | 640 | 7.53 | 3.99 | 14 |
| 16 | 23.0 | 70/15/15 | Homog | 10 | 1.0 | 7.52 | 930 | 760 | 7.19 | 3.65 | 14 |

METHOD FOR MAKING TISSUE AND TOWEL PRODUCTS CONTAINING CROSSLINKED CELLULOSIC FIBERS

CROSS-REFERENCE TO RELATED APPLICATION

This application claims the benefit of U.S. Provisional Application No. 60/375,964, filed Apr. 25, 2002, which is expressly incorporated herein by reference in its entirety.

FIELD OF THE INVENTION

The present invention relates to tissue and towel products containing crosslinked cellulosic fibers and methods for their manufacture.

BACKGROUND OF THE INVENTION

Tissue and towel products made from cellulosic fibers are advantageous because they are biodegradable, are made from a renewable resource, and can be recycled. One drawback to a typical cellulosic tissue or towel product is that the product can have a relatively high density or low bulk. Bulk is the reciprocal of density and is the volume occupied by a specific weight of material and is designated in $cm^3/g$. The amount of cellulosic material required to provide the requisite strength for a typical tissue or towel product creates a heavy product.

Crosslinked cellulosic fibers impart bulk to cellulose sheets that include such fibers. However, the addition of crosslinked cellulosic fibers to such sheets tends to diminish sheet strength.

The need exists for improved tissue and towel products, particularly tissue and towel products having the advantageous properties of bulk, porosity, and absorbent capacity while at the same time having sufficient strength and integrity to be useful in typical applications. The present invention seeks to fulfill these needs and provides further related advantages.

SUMMARY OF THE INVENTION

In one aspect, the present invention provides a fibrous product that includes crosslinked cellulosic fibers and softwood kraft pulp fibers having high hemicellulose content. The crosslinked fibers advantageously impart bulk and absorbent capacity to the product, and the softwood kraft pulp fibers having high hemicellulose content advantageously impart sheet strength and liquid wicking to the fibrous product. Representative fibrous products include tissue and towel products.

In another aspect of the invention, methods for making the fibrous product are provided.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a table summarizing the composition and properties of representative towel products of the invention.

DETAILED DESCRIPTION OF THE PREFERRED EMBODIMENT

In one aspect, the present invention provides a fibrous product that includes crosslinked cellulosic fibers. In addition to crosslinked cellulosic fibers, the product also includes softwood fibers prepared by the kraft process (i.e., softwood kraft pulp fibers) having a high hemicellulose content compared to other kraft softwood fibers and hardwood fibers. The softwood kraft pulp fibers having a high hemicellulose content and hardwood fibers impart strength to the fibrous product. Without being bound to the theory, it is believed that the advantageous bulk imparted to the fibrous product of the invention by the incorporation of crosslinked cellulosic fibers is accompanied by a diminution of sheet strength, which is returned to the fibrous product by the inclusion of softwood kraft pulp fibers having high hemicellulose content and hardwood fibers.

The fibrous product of the invention can be a facial tissue, toilet tissue, disposable wipe, napkin, handkerchief, or paper towel. The fibrous product can include one or more layers within one or more plies. A product having one or more layers can be made on a tissue machine. Adjacent layers may have the same or different types of fibers. A layer can include one or more types of fibers. For example, a representative product of the invention is a three-layered sheet with two fiber types in each layer. A finished product paper towel, toilet tissue, facial tissue, or napkin may include one or more plies combined in the converting process.

Figure 1:
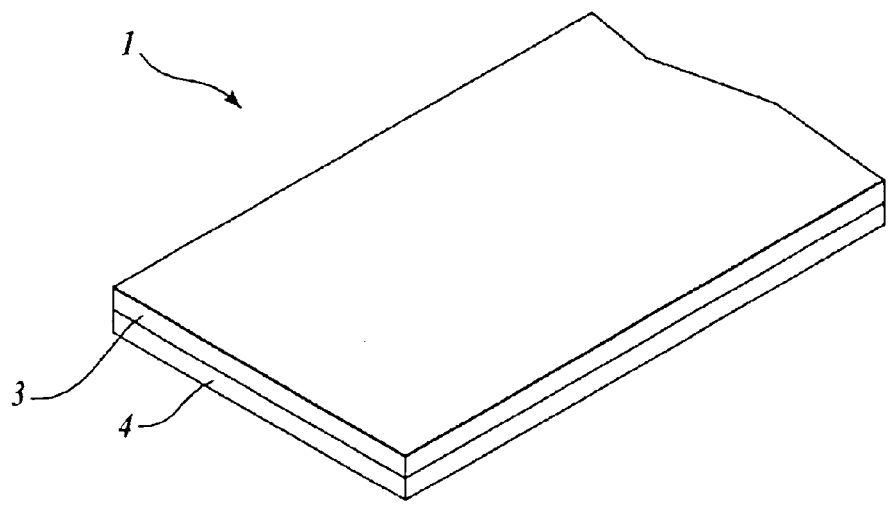
FIG. 1 is a perspective view of a portion of a representative two-ply product of the invention.
Figure 2:
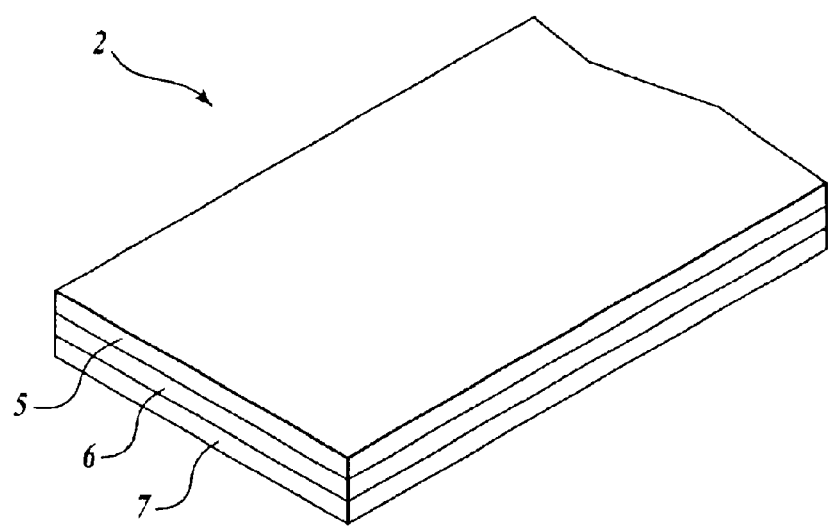
FIG. 2 is a perspective view of a portion of a representative three-ply product of the invention.

Representative products of the invention having two and three plies are illustrated in FIGS. 1 and 2, respectively. Referring to FIG. 1, representative product 1 has two plies, 3 and 4. Plies 3 and 4 are coextensive. Referring to FIG. 2, representative product 2 has three plies, 5, 6, and 7. Plies 5, 6, and 7 are coextensive.

Crosslinked Cellulosic Fibers. The fibrous product of the invention includes crosslinked cellulosic fibers that impart advantageous properties, including increased bulk, to the fibrous product not observed for other fibrous products that do not include crosslinked cellulosic fibers.

As used herein, the term "crosslinked cellulosic fiber" refers to a cellulosic fiber that has been treated with an amount of a crosslinking agent to impart advantageous bulk to the fiber. As used herein, the term "crosslinked cellulosic fiber" refers to a cellulosic fiber that is intrafiber crosslinked.

Any one of a number of crosslinking agents and crosslinking catalysts, if necessary, can be used to provide the crosslinked fibers useful in the fibrous product. The following are representative crosslinking agents and catalysts. Each of the patents noted below is expressly incorporated herein by reference in its entirety.

Suitable urea-based crosslinking agents include substituted ureas such as methylolated ureas, methylolated cyclic ureas, methylolated lower alkyl cyclic ureas, methylolated dihydroxy cyclic ureas, dihydroxy cyclic ureas, and lower alkyl substituted cyclic ureas. Specific urea-based crosslinking agents include dimethyldihydroxy urea (DMDHU, 1,3- dimethyl-4,5-dihydroxy-2-imidazolidinone), dimethylol dihydroxy ethylene urea (DMDHEU, 1,3-dihydroxymethyl-4,5-dihydroxy-2-imidazolidinone), dimethylol urea (DMU, bis[N-hydroxymethyl]urea), dihydroxyethylene urea (DHEU, 4,5-dihydroxy-2-imidazolidinone), dimethyloleth-ylene urea (DMEU, 1,3-dihydroxymethyl-2-imidazolidinone), and dimethyldihydroxyethylene urea (DMeDHEU or DDI, 4,5-dihydroxy-1,3-dimethyl-2-imidazolidinone).

Suitable crosslinking agents include dialdehydes such as $C_2$–$C_8$ dialdehydes (e.g., glyoxal), $C_2$–$C_8$ dialdehyde acid analogs having at least one aldehyde group, and oligomers of these aldehyde and dialdehyde acid analogs, as described in U.S. Pat. Nos. 4,822,453; 4,888,093; 4,889,595; 4,889,596; 4,889,597; and 4,898,642. Other suitable dialdehyde crosslinking agents include those described in U.S. Pat. Nos. 4,853,086; 4,900,324; and 5,843,061.

Other suitable crosslinking agents include aldehyde and urea-based formaldehyde addition products. See, for example, U.S. Pat. Nos. 3,224,926; 3,241,533; 3,932,209; 4,035,147; 3,756,913; 4,689,118; 4,822,453; 3,440,135; 4,935,022; 3,819,470; and 3,658,613.

Suitable crosslinking agents include glyoxal adducts of ureas, for example, U.S. Pat. No. 4,968,774, and glyoxal/cyclic urea adducts as described in U.S. Pat. Nos. 4,285,690; 4,332,586; 4,396,391; 4,455,416; and 4,505,712.

Other suitable crosslinking agents include carboxylic acid crosslinking agents such as polycarboxylic acids. Polycarboxylic acid crosslinking agents (e.g., citric acid, propane tricarboxylic acid, and butane tetracarboxylic acid) and catalysts are described in U.S. Pat. Nos. 3,526,048; 4,820,307; 4,936,865; 4,975,209; and 5,221,285. The use of $C_2$–$C_9$ polycarboxylic acids that contain at least three carboxyl groups (e.g., citric acid and oxydisuccinic acid) as crosslinking agents is described in U.S. Pat. Nos. 5,137,537; 5,183,707; 5,190,563; 5,562,740, and 5,873,979.

Polymeric polycarboxylic acids are also suitable crosslinking agents. Suitable polymeric polycarboxylic acid crosslinking agents are described in U.S. Pat. Nos. 4,391,878; 4,420,368; 4,431,481; 5,049,235; 5,160,789; 5,442,899; 5,698,074; 5,496,476; 5,496,477; 5,728,771; 5,705,475; and 5,981,739. Polyacrylic acid and related copolymers as crosslinking agents are described U.S. Pat. Nos. 5,549,791 and 5,998,511. Polymaleic acid crosslinking agents are described in U.S. Pat. No. 5,998,511.

Specific suitable polycarboxylic acid crosslinking agents include citric acid, tartaric acid, malic acid, succinic acid, glutaric acid, citraconic acid, itaconic acid, tartrate monosuccinic acid, maleic acid, polyacrylic acid, polymethacrylic acid, polymaleic acid, polymethylvinylether-co-maleate copolymer, polymethylvinylether-co-itaconate copolymer, copolymers of acrylic acid, and copolymers of maleic acid.

Other suitable crosslinking agents are described in U.S. Pat. Nos. 5,225,047; 5,366,591; 5,556,976; and 5,536,369.

Suitable catalysts can include acidic salts, such as ammonium chloride, ammonium sulfate, aluminum chloride, magnesium chloride, magnesium nitrate, and alkali metal salts of phosphorous-containing acids. In one embodiment, the crosslinking catalyst is sodium hypophosphite.

Mixtures or blends of crosslinking agents and catalysts can also be used.

The crosslinking agent is applied to the cellulosic fibers in an amount sufficient to effect intrafiber crosslinking. The amount applied to the cellulosic fibers can be from about 1 to about 10 percent by weight based on the total weight of fibers. In one embodiment, crosslinking agent in an amount from about 4 to about 6 percent by weight based on the total weight of fibers.

Cellulosic fibers may be treated with a debonding agent prior to treatment with the crosslinking agent. Debonding agents tend to minimize interfiber bonds and allow the fibers to separated from each other more easily. The debonding agent may be cationic, nonionic or anionic. Cationic debonding agents appear to be superior to nonionic or anionic debonding agents. The debonding agent typically is added to cellulose fiber stock.

Suitable cationic debonding agents include quaternary ammonium salts. These salts typically have one or two lower alkyl substituents and one or two substituents that are or contain fatty, relatively long-chain hydrocarbon. Nonionic debonding agents typically comprise reaction products of fatty-aliphatic alcohols, fatty-alkyl phenols and fatty-aromatic and aliphatic acids that are reacted with ethylene oxide, propylene oxide, or mixtures of these two materials.

Examples of debonding agents may be found in Hervey et al., U.S. Pat. Nos. 3,395,708 and 3,544,862; Emanuelsson et al., U.S. Pat. No. 4,144,122; Forssblad et al., U.S. Pat. No. 3,677,886; Osborne III, U.S. Pat. No. 4,351,699; Hellston et al., U.S. Pat. No. 4,476,323; and Laursen, U.S. Pat. No. 4,303,471, all of which are in their entirety incorporated herein by reference. A suitable debonding agent is Berocell 584 from Berol Chemicals, Incorporated of Metairie, La. It may be used at a level of 0.25% weight of debonder to weight of fiber.

Crosslinked cellulosic fibers are present in the fibrous product in an amount from about 3 to about 25 percent by weight of the fibrous product. In one embodiment, the crosslinked cellulosic fibers are present in an amount from about 5 to about 20 percent by weight of the fibrous product. In another embodiment, the crosslinked cellulosic fibers are present in an amount from about 10 to about 15 percent by weight of the fibrous product.

In addition to crosslinked cellulosic fibers, the fibrous product of the invention includes softwood kraft pulp fibers having high hemicellulose content and optionally hardwood fibers. These fibers impart advantageous properties, including increased sheet strength, liquid wicking, and softness to the fibrous product.

High Hemicellulose Content Fibers. The softwood kraft pulp fibers suitable for use in the fibrous product of the invention are chemical wood pulp fibers prepared from softwood by the kraft process and have increased hemicellulose content compared to conventional kraft chemical pulps. Because hemicellulose imparts flexibility to a fiber, the pulp fibers of the invention are more flexible in papermaking systems and exhibit greater interfiber bonding compared to conventional kraft chemical pulps. The increased flexibility and interfiber bonding of the fibers renders sheets or webs that incorporate these fibers stronger than sheets or webs incorporating conventional kraft chemical pulp fibers. The pulp provides sheets having initial (unrefined) tensile strengths significantly greater than sheets incorporating conventional kraft chemical pulp fibers.

As a result of the pulp fiber's flexibility and increased hydrogen bonding potential, the amount of refining required to achieve a particular sheet strength (tensile strength) or advantageous drainage property (Canadian Standard Freeness, CSF) is also greatly reduced. Thus, the pulp can be refined to a predetermined point more readily than a conventional kraft chemical pulp making the pulp attractive from a refining energy requirement basis. The pulp is more readily refined than conventional kraft chemical pulps and achieves strength/drainage properties at significantly less refining energy.

Suitable pulps have a hemicellulose content greater than about 17 percent as measured by the 18% caustic solubility test described below. The hemicellulose content of the pulp is about 2 percent greater than conventional chemical pulps. Other conventionally produced softwood kraft pulps have a hemicellulose content less than about 16 percent as measured by the 18% caustic solubility test.

The hemicellulose content of pulp can be measured by several methods. One empirical method is the 18% caustic solubility method (TAPPI T-235 CM-00). In this method, a weighed quantity of pulp (1.5 g) is soaked in 18 percent by weight aqueous sodium hydroxide (100 mL) for 1 hour. During the soak, the pulp fibers swell and the pulp's hemicellulose dissolves into solution. The pulp is then filtered, and 10 mL of the filtrate is mixed with 10 mL of potassium dichromate and 30 mL sulfuric acid. This solution is titrated with ferrous ammonium sulfate. The percent alkali solubility is then calculated using the amounts of the various solutions and the amount of pulp. The method is usually an underestimate of hemicellulose content because not all of the hemicellulose is dissolved and removed from the pulp during this procedure. Hemicellulose content for a pulp may also be determined by sugar analysis of completely digested pulp. Such a determination would generally provide a higher hemicellulose content value than the 18% caustic solubility method.

Suitable high hemicellulose content fibers can be prepared from northern softwoods. One suitable high hemicellulose content fiber is northern bleached softwood kraft (NBSK) pulp fiber, commercially available from Weyerhaeuser Company as Grand Prairie Softwood.

High hemicellulose content fibers are present in the fibrous product in an amount from about 10 to about 97 percent by weight of the fibrous product. In one embodiment, the high hemicellulose content fibers are present in an amount from about 50 to about 90 percent by weight of the fibrous product. In another embodiment, the high hemicellulose content fibers are present in an amount from about 70 to about 90 percent by weight of the fibrous product. In the fibrous product of the invention, a portion of the high hemicellulose content fibers can be replaced with conventional kraft pulp fibers.

Hardwood Fibers. Hardwood pulp fibers can also be included in the fibrous product to impart desired properties to the product. Suitable hardwood pulp fibers include kraft pulp fibers prepared from aspen, maple, birch, and eucalyptus.

When included, the hardwood fibers are present in the fibrous product in an amount from about 2 to about 70 percent by weight of the fibrous product. In one embodiment, the hardwood fibers are present in an amount from about 2 to about 35 percent by weight of the fibrous product. In another embodiment, the hardwood fibers are present in an amount from about 2 to about 20 percent by weight of the fibrous product.

Other fibers. In addition to crosslinked fibers, softwood kraft pulp fibers having high hemicellulose content, and hardwood fibers, the fibrous product of the invention can also include other cellulosic fibers. Suitable cellulosic fibers include those known to those skilled in the art and include any fiber or fibrous mixture from which a fibrous web or sheet can be formed. The cellulosic fibers can be obtained from any source, including cotton, hemp, grasses, cane, husks, cornstalks, or wood.

Although available from other sources, cellulosic fibers are derived primarily from wood pulp. Suitable wood pulp fibers for use with the invention can be obtained from well-known chemical processes such as the kraft and sulfite processes, with or without subsequent bleaching. Pulp fibers can also be processed by thermomechanical, chemithermomechanical methods, or combinations thereof. The preferred pulp fiber is produced by chemical methods. Groundwood fibers, recycled or secondary wood pulp fibers, and bleached and unbleached wood pulp fibers can be used. Softwoods and hardwoods can be used. Details of the selection of wood pulp fibers are well known to those skilled in the art. These fibers are commercially available from a number of companies, including Weyerhaeuser Company. For example, suitable cellulose fibers produced from southern pine that are usable with the present invention are available from Weyerhaeuser Company under the designations Columbus Pine Softwood and Port Wentworth Softwood, and cellulose fibers produced from northern softwood available from Weyerhaeuser Company under the designations Grand Prairie Softwood, Prince Albert Softwood, and Tyee Kraft. Other suitable wood pulp fibers include southern softwood kraft pulp, European softwood kraft pulp fibers (e.g., Skogscell 85 Z), and bleached chemithermomechanical pulp (BCTMP) fibers (SCA).

In addition to fibrous materials, such as crosslinked cellulosic fibers, softwood kraft pulp fibers having high hemicellulose content, and hardwood fibers, and other cellulosic fibers, the fibrous product of the invention can include other materials common to papermaking. These other materials common to papermaking include wet strength agents, carboxymethyl cellulose, and starch, among others.

Strengthening Agents. The fibrous product can optionally include a strengthening agent such as a wet strength agent. Suitable wet strength agents include cationic modified starch having nitrogen-containing groups (e.g., amino groups) such as those available from National Starch and Chemical Corp., Bridgewater, N.J.; latex; wet strength resins, such as polyamide-epichlorohydrin resin (e.g., KYMENE 557LX, Hercules, Inc., Wilmington, Del.), and polyacrylamide resin (see, e.g., U.S. Pat. No. 3,556,932 and also the commercially available polyacrylamide marketed by American Cyanamid Co., Stanford, Conn., under the trade name PAREZ 631 NC); urea formaldehyde and melamine formaldehyde resins; and polyethylenimine resins. A general discussion on wet strength resins utilized in the paper field, and generally applicable in the present invention, can be found in TAPPI monograph series No. 29, "Wet Strength in Paper and Paperboard", Technical Association of the Pulp and Paper Industry (New York, 1965). In one embodiment, the fibrous product includes a polyamide-epichlorohydrin resin.

Other suitable strengthening agents (e.g., binding agents) include starch, modified starch, polyvinyl alcohol, polyvinyl acetate, polyethylene/acrylic acid copolymer, acrylic acid polymers, polyacrylate, polyacrylamide, polyamine, guar gum, oxidized polyethylene, polyvinyl chloride, polyvinyl chloride/acrylic acid copolymers, acrylonitrile/butadiene/styrene copolymers and polyacrylonitrile. Many of these will be formed into latex polymers for dispersion or suspension in water.

The strengthening agent can be present in the fibrous product in an amount up to about 15 kg per metric ton fiber (kg/MT).

Figure 4:
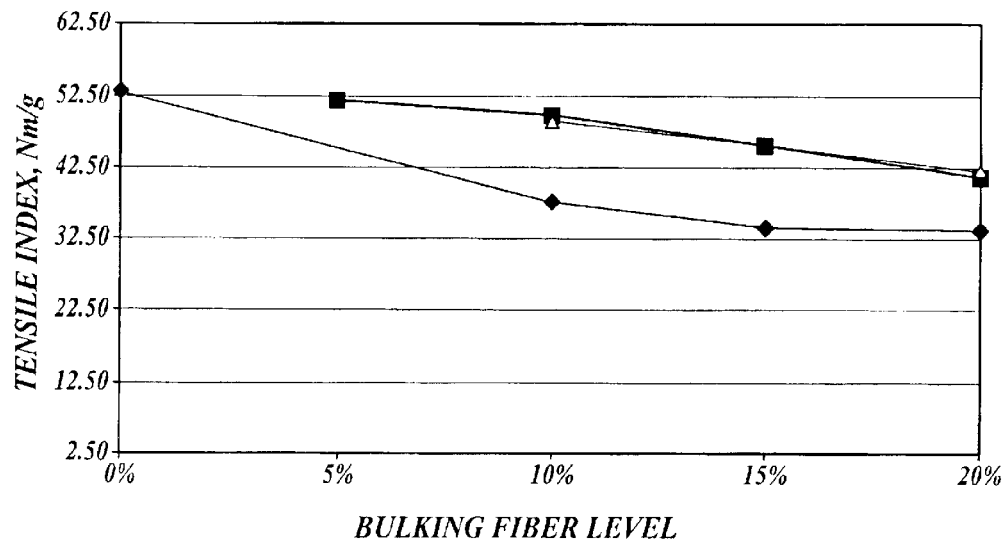
FIG. 4 is a graph illustrating the effect of wet strength agent (KYMENE) on the dry tensile of representative products of the invention.

The effect of a wet strength agent (KYMENE) on the dry tensile of representative products of the invention is depicted graphically in FIG. 4. FIG. 4 illustrates that tensile index decreases with increasing bulking fiber (crosslinked cellulosic fiber) level and that adding a wet strength agent increases tensile index. In FIG. 4, the diamond (♦) curve represents a fibrous product that does not include wet strength agent; the square (■) curve represents a fibrous product that includes 0.5 percent by weight wet strength agent based on the total weight of the fibrous product; and the triangle (Δ) curve represents a fibrous product that includes 1.5 percent by weight wet strength agent based on the total weight of the fibrous product.

Figure 5:
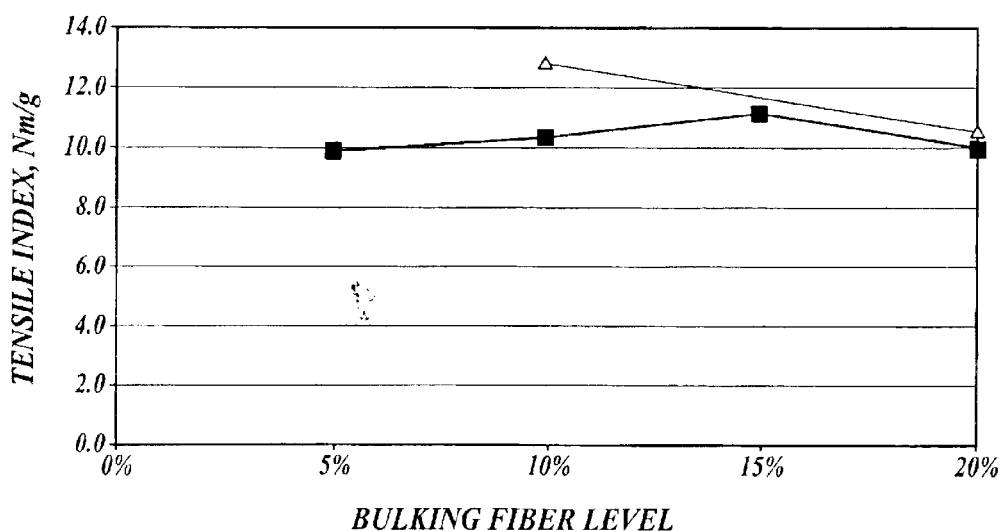
FIG. 5 is a graph illustrating the effect of wet strength agent (KYMENE) on the wet tensile of representative products of the invention.

The effect of wet strength agent (KYMENE) on the wet tensile of representative products of the invention is depicted graphically in FIG. 5. FIG. 5 illustrates that tensile index remains about constant with increasing bulking fiber (crosslinked cellulosic fiber) level when a wet strength agent is included in the fibrous product. In FIG. 5, the square (■) curve represents a fibrous product that includes 0.5 percent by weight wet strength agent based on the total weight of the fibrous product; and the triangle (Δ) curve represents a fibrous product that includes 1.5 percent by weight wet strength agent based on the total weight of the fibrous product.

The fibrous product optionally includes carboxymethyl cellulose. Carboxylmethyl cellulose imparts strength to the fibrous product.

The tissue and towel products of the invention include crosslinked fibers, softwood kraft pulp fibers having high hemicellulose content, and optionally hardwood fibers, other cellulosic fibers, and one or more other materials common to papermaking (e.g., binding or strengthening agents). As noted above, the crosslinked cellulosic fibers impart advantageous bulk, porosity, and absorbent capacity to the tissue or towel product. The non-crosslinked fibers (for example, softwood fibers, hardwood fibers, mixtures of softwood and hardwood fibers, secondary fibers) impart desirable liquid acquisition and wicking as well as strength and softness characteristics to the products. The optional binding agent imparts dry and wet tensile strength to the products. Thus, the tissue and towel products of the invention have increased bulk, decreased density, and strength that is substantially the same as products made without high-bulk fiber.

Other benefits obtained by using crosslinked cellulosic fibers in tissue and towel products include an increase in stretch, increased softness, and increased liquid-holding capacity. The wicking or absorbency rate of a tissue and towel product is also significantly increased with crosslinked fibers. Tissue products containing crosslinked fibers crepe without difficulty and actually yield an improvement in stretch at a given strength level.

The basis weight for the fibrous product of the invention ranges from about 15 gsm to about 70 gsm per ply. In one embodiment, the basis weight for the fibrous product ranges from about 15 gsm to about 30 gsm per ply.

The tissue and towel products of the invention can be single ply products. Alternatively, the tissue and towel products of the invention can be multi-ply products, and include two, three, or more plies. For products of the invention that include more than a single ply, these products can be made by combining the plies in the converting process. The individual plies of a multi-ply product can be the same or different.

A single ply can be homogeneous in composition. Alternatively, a single ply can be stratified with respect to composition and have one stratum enriched with crosslinked cellulosic fibers and another stratum enriched with non-crosslinked fibers. For example, for a single-ply product, one surface of the product can be enriched with crosslinked fibers to enhance that surface's bulk and the other surface enriched with non-crosslinked fibers to enhance that surface's softness characteristics.

The compositions and properties of representative towel products of the invention are compared with other towel products in Table 1 (FIG. 6). In these tables, "BW" refers to basis weight; "Furnish" refers to the pulp or pulps making up the fibrous product; "NBSK" refers to northern bleached softwood kraft pulp having a high hemicellulose content; "NBHK" refers to northern hardwood kraft pulp, for example, aspen, maple, birch, or eucalyptus kraft pulps; "XL" refers to crosslinked cellulosic fibers (malic acid crosslinked cellulosic fibers); "Structure" refers to the fibrous product being either a homogenous product (Homog) or a stratified product (Strata); "CMC" refers to carboxymethyl cellulose; "MD tens" refers to the machine direction tensile strength measured in grams-force per 2-1 inch product strips (gf/2-1 in) (see below for method); "CD tens" refers to the cross-machine direction tensile strength measured in grams-force per 2-1 inch product strips (gf/2-1 in) (see below for method); "Abs. Capacity" refers to absorbent capacity in grams water per gram product (see below for method); "Abs. Time" refers to absorbent time in seconds (see below for method); and "NBSK Refining Level" refers to the level that the NBSK was refined in units of S.R.° (Shopper Riegel degrees).

Table 1 summarizes the compositions and some properties of representative towel products compared to other towel compositions. In Table 1, the representative towel products include crosslinked cellulosic fibers ("XL") in an amount from about 8 to about 20 percent by weight based on the total weight of the fibrous product; softwood kraft pulp fibers having high hemicellulose content ("NBSK") in an amount from about 70 to about 75 percent by weight based on the total weight of the fibrous product; hardwood kraft pulp fibers ("NBHK") in an amount from about 8 to about 15 percent by weight based on the total weight of the fibrous product; and wet strength agent (polyamideepichlorohydrin resin, KYMENE) in an amount from about 6 to about 10 kg/MT fiber; and optionally carboxymethyl cellulose ("CMC") in an amount from about 0 to about 1.0 percent by weight based on the total weight of the fibrous product. The representative towel products are designated Nos. 4–16 in Table 1. Representative towel products designated Nos. 4–9 are stratified products, and representative towel products designated Nos. 10–16 are homogenous products. Comparing towel products Nos. 1–3, which do not include crosslinked cellulosic fibers, with representative towel products Nos. 4–16, which do include crosslinked cellulosic fibers, it is apparent that the presence of crosslinked fibers increases the bulk of those towels that include crosslinked fibers (Bulk from 4.99 to 5.92 for Nos. 1–3, and 5.90 to 8.29 for Nos. 4–16). Although the advantageous bulk associated with the representative towel products of the invention is accompanied by some loss of strength compared to towel products that do not include crosslinked fibers, the representative towels of the invention have strength sufficient to perform their desired function. The absorbent capacities of the representative towels of the invention that include crosslinked fibers are also generally greater than those towels that do not include crosslinked fibers.

Absorbent Capacity. Absorbent capacity (Abs. Capacity, g/g) is the fluid capacity of a tissue or towel sample on a grams fluid per gram fiber mass basis. The method for determining absorbance capacity is as follows:

1. Cut several sheets to 10 cm×10 cm size.
2. Weigh out enough of these cut sheets to have approximately 5 g of dry sample; record as Dry Sample Weight.
3. Roll the samples up together, loosely, and put them into a wire basket (about 2 inch diameter×about 3 inches high, with a wire hook extending out the top side); record the weight of the sample plus basket as Dry Sample+Basket Weight.
4. Lower the sample in the basket into a container of distilled water at 22° C. and let soak for 1 minute.
5. Remove the sample and basket from the water; hang the basket so the sample drains for 1 minute.
6. Weigh the basket and wet sample; record as Wet Sample+Basket Weight.
7. Calculate Absorbent Capacity:

$$g/g=[(\text{Wet Sample+Basket Weight})-(\text{Dry Sample+Basket Weight})]/\text{Dry Sample Weight}.$$

Absorption Time. Absorption time (Abs. Time, sec) is the time required for a given number of sheets of sample to fully wet out. The method for determining absorption time is as follows:

1. Cut out 40 10 cm×10 cm sheets of the tissue or towel sample material, and make a neat, compacted stack.
2. With a stop watch ready, drop the stack into a tray containing 22° C. distilled water, and immediately begin the timer when it first touches the water's surface.
3. Stop the timer when the last of the samples wets out.
4. Record the time in seconds as "Absorption Time."

MD and CD Tensile Strength. The tensile strength values presented in Table 1 are measures of the maximum force in grams-force to failure of a 2-sample 'stack'. The tensile strength values were determined using a Regmed DI-5000 (Flatbed) horizontal tester by the following method.

1. Samples were cut 25.4 mm×210 mm (long dimension in the machine direction (MD) or cross-machine direction (CD) depending on the test orientation.
2. Sample strips were placed in the tester, one atop the other; the width between tester jaws was fixed at 100 mm.
3. Tester pull speeds were set at 75 mm/minute for MD tests and 25 mm/minute for CD tests.
4. Maximum force to sample failure is tensile strength recorded in units of "gf/2-1 inch", where "2-1 inch" refers to the tested sample: 2 strips that were 1 inch in length.

In another aspect of the invention, methods for making the fibrous product are provided. Representative fibrous products of the invention can be made using conventional papermaking machines including, for example, Rotoformer, Fourdrinier, Crescent former, inclined wire Delta former, and twin-wire machines.

In one embodiment, the fibrous product can be made by a wetlaid process using the components described above. The wetlaid method can be practiced on an inclined wire Delta former. In another embodiment, the product is made by a foam-forming method using the components described above. Wetlaid and foam-forming processes can be practiced on a twin-wire former.

A representative twin-wire method for forming a fibrous product of the invention includes the following steps:

(a) forming a fibrous slurry comprising fibers in an aqueous dispersion medium; for a foam method, the slurry is a foam that includes, in addition to fibers, a surfactant (for a two-ply product, a second fibrous slurry that is the same or different from the first is formed and then deposited as recited in step (e) below);

(b) moving a first forming wire in a first path;

(c) moving a second forming wire in a second path;

(d) passing a first portion of the slurry into contact with the first forming wire moving in a first path;

(e) passing a second portion of the slurry (or a second fibrous slurry) into contact with the second forming wire moving in the second path; and (f) forming a fibrous web from the deposited slurries by withdrawing liquid from the slurry through the first and second forming wires.

As noted above, the foam-forming method is suitably carried out on a twin-wire former, preferably a vertical former, and more preferably, a vertical downflow twin-wire former. In the vertical former, the paths for the forming wires are substantially vertical.

In one method, the twin-wire former includes a means for introducing at least a third material (e.g., the first, the second, or third fiber/foam slurry) through the interior structure. The first, second, and third fiber/foam slurries can include the same or different components (e.g., crosslinked cellulosic fibers, southern pine fibers, eucalyptus fibers) and have the same or different composition. Depending upon the nature of the composite to be formed, the first and second fiber/foam slurries may be the same as or different from each other, and the same as or different from a third material. Such a headbox configuration is suitable for providing a three-ply product. Other headbox configurations having no baffles, one baffle, or more than two baffles can also be used to make tissue and towel products having a single, two, or more plies, respectively.

The means for withdrawing liquid/foam from the first and second slurries through the foraminous elements to form a web on the foraminous elements are also included in the headbox assembly. The means for withdrawing liquid/foam can include any conventional means for that purpose, such as suction rollers, pressing rollers, or other conventional structures. In a preferred embodiment, first and second suction box assemblies are provided and mounted on the opposite sides of the interior structure from the forming wires.

The fibrous product of the invention can be made on conventional tissue making machines. Such machines generally include a headbox having single or multi-layer capacity from which the furnish is deposited onto a forming wire to provide a mat, a suction press roll or shoe press that removes additional water and presses the mat onto a Yankee dryer (i.e., cylindrical dryer), and a creping device that crepes the dried mat from the dryer. The final creped product is wound onto a roll.

In a method for making the fibrous product, a fibrous furnish including the crosslinked cellulosic fibers, softwood kraft pulp fibers, and hardwood kraft pulp fibers is deposited onto a forming wire and dewatered to provide a mat. The mat is conveyed to a suction press roll or shoe press where additional water is removed and the mat is pressed onto a Yankee dryer where it is dried. The dried mat is then creped from the dryer and the creped mat wound onto a roll.

Figure 3:
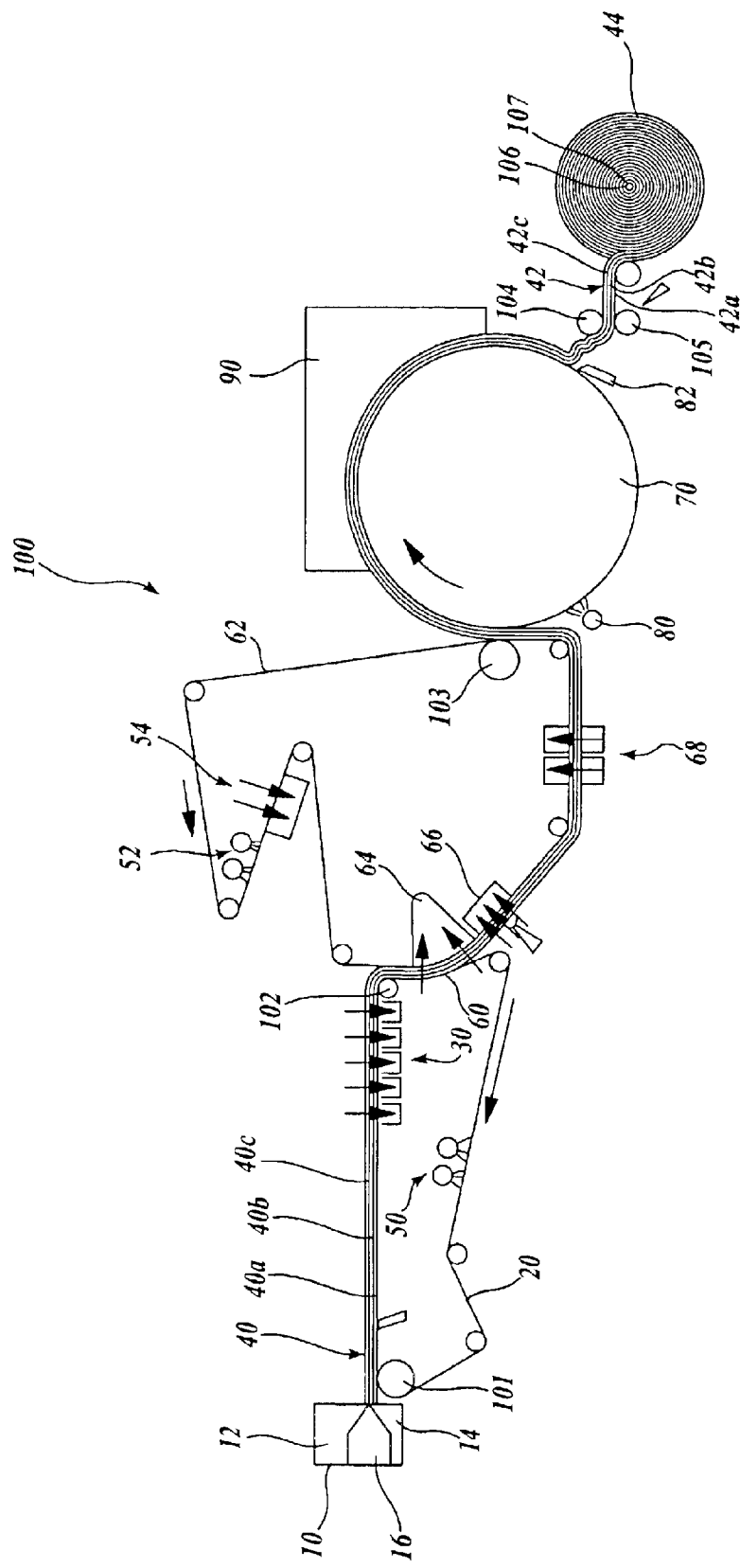
FIG. 3 is a schematic illustration of a representative through-air dried tissue machine useful in making the products of the invention.

A schematic illustration of a representative through-air dried tissue machine useful in making the fibrous product of the invention is shown in FIG. 3. Referring to FIG. 3, tissue machine 100 includes layered head box 10 having top chamber 12, center chamber 16, and bottom chamber 14, Fourdrinier wire 20 looped over and about breast roll 101, vacuum suction boxes 30, and couch roll 102. In a representative operation for making a three-layered tissue product, a first papermaking furnish is pumped through top chamber 12, a second papermaking furnish is pumped through center chamber 16, and a third furnish is pumped through bottom chamber 14 onto wire 20 to form embryonic web 40 having layers 40*a*, 40*b*, and 40*c*. Dewatering occurs through wire 20 and vacuum boxes 30. As the wire makes its return in the direction shown by the arrow, showers 50 clean the wire prior to its beginning another pass over breast roll 101. At web transfer zone 60, embryonic web 40 is transferred to foraminous carrier fabric 62 by the action of vacuum transfer box 64. Carrier fabric 62 carries the web from transfer 60 past vacuum dewatering box 66 through predryers 68 after which the web is transferred to a Yankee dryer 70 by the action of pressure roll 103. The carrier fabric 62 is then cleaned and dewatered as it completes its loop by passing showers 52 and vacuum dewatering box 54. The predried paper web is adhesively secured to the cylindrical surface of Yankee dryer 70 by adhesive supplied by spray applicator 80. Drying is completed on steam-heated Yankee dryer 70 and by hot air heated and circulated through drying hood 90. The web is then dry creped from Yankee dryer 70 by doctor blade 82 after which sheet 42 including a Yankee-side layer 42*a*, a center layer 42*b*, and an off-Yankee-side layer 42*c*. Sheet 42 then passes between calendar rolls 104 and 105 and is reeled onto core 106 disposed on shaft 107 to provide roll 44.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for making a fibrous product, comprising
   (a) depositing a fibrous furnish onto a forming wire, wherein the fibrous furnish comprises crosslinked cellulosic fibers and softwood kraft pulp fibers having a hemicellulose content greater than about 17 percent as measured by the 18 percent caustic solubility test;
   (b) dewatering the deposited furnish to provide a mat;
   (c) drying the mat to provide a fibrous product.

2. The method of claim 1, wherein the crosslinked cellulosic fibers are present in an amount from about 3 to about 25 percent by weight based on the total weight of the product.

3. The method of claim 1, wherein the softwood kraft pulp fibers are present in an amount from about 10 to about 97 percent by weight based on the total weight of the product.

4. The method of claim 1, wherein the softwood kraft pulp fibers comprise northern bleached softwood kraft pulp fibers.

5. The method of claim 1, wherein the furnish further comprises hardwood kraft pulp fibers.

6. The method of claim 5, wherein the hardwood kraft pulp fibers are present in an amount from about 2 to about 70 percent by weight based on the total weight of the product.

7. The method of claim 5, wherein the hardwood kraft pulp fibers are at least one of aspen, maple, birch, or eucalyptus kraft pulp fibers.

8. The method of claim 1, wherein the furnish further comprises a wet strength agent.

9. The method of claim 1, wherein the product is at least one of a tissue or a towel.

10. The method of claim 1, wherein the product comprises two or more plies.

11. The method of claim 1, wherein the product comprises two or more layers within a ply.

12. A method for making a fibrous product, comprising
    (a) depositing a fibrous furnish onto a forming wire to provide a mat, wherein the fibrous furnish comprises crosslinked cellulosic fibers and softwood kraft pulp fibers having a hemicellulose content greater than about 17 percent as measured by the 18 percent caustic solubility test;
    (b) conveying the mat to a suction press roll;
    (c) advancing the mat from the suction press roll onto a cylindrical dryer;
    (d) creping the mat from the dryer to provide a creped mat; and
    (e) winding the creped mat into a roll.

13. The method of claim 12, wherein depositing the furnish onto the forming wire comprises depositing the furnish from a headbox having single or multi-layer capacity.

14. The method of claim 12, wherein the mat comprises two layers.

15. The method of claim 12, wherein the mat comprises three layers.

16. The method of claim 12, wherein the creped mat is at least one of a tissue or a towel.

17. The method of claim 12, wherein the furnish further comprises hardwood kraft pulp fibers.

18. The method of claim 17, wherein the hardwood kraft pulp fibers are present in an amount from about 2 to about 70 percent by weight based on the total weight of the product.

19. The method of claim 12, wherein the crosslinked cellulosic fibers are present in an amount from about 3 to about 25 percent by weight based on the total weight of the product.

20. The method of claim 12, wherein the softwood kraft pulp fibers are present in an amount from about 10 to about 97 percent by weight based on the total weight of the product.

* * * * *